United States Patent [19]

Kawai et al.

[11] Patent Number: 4,570,590
[45] Date of Patent: Feb. 18, 1986

[54] INTERNAL COMBUSTION ENGINE WITH MULTIPLE INTAKE VALVES

[75] Inventors: Taiyo Kawai; Norihisa Nakagawa, both of Susono; Nobuaki Kayanuma, Gotenba; Toshinari Nagai, Susono, all of Japan

[73] Assignee: Toyota Jidosha Kabushiki Kaisha, Aichi, Japan

[21] Appl. No.: 707,872

[22] Filed: Mar. 4, 1985

[30] Foreign Application Priority Data

Jul. 10, 1984 [JP] Japan ............... 59-103124[U]

[51] Int. Cl.⁴ ............... F02B 31/02; F02B 25/00
[52] U.S. Cl. ............... 123/308; 123/52 M; 123/90.16; 123/432
[58] Field of Search ............... 123/432, 308, 90.16, 123/52 M, 188 M

[56] References Cited

U.S. PATENT DOCUMENTS 4,285,310 8/1981 Takizawa et al. ............... 123/432
4,479,470 10/1984 Ishida ............... 123/308

FOREIGN PATENT DOCUMENTS 183553 11/1982 Japan ............... 123/308

Primary Examiner—E. Rollins Cross
Attorney, Agent, or Firm—Parkhurst & Oliff

[57] ABSTRACT

An engine with three intake ports and three intake valves for each cylinder. The first intake port is a helical port. The remaining two intake ports have intake control valves, which open when the engine speed and the engine load are large and close when the engine speed and the engine are small. Air thus is introduced alternatively from the first port only or from all the ports. Fuel is injected in the third port between the corresponding intake valve and intake control valve.

5 Claims, 4 Drawing Figures

INTERNAL COMBUSTION ENGINE WITH MULTIPLE INTAKE VALVES

BACKGROUND OF THE INVENTION

1. Field of the Invention

The present invention relates to an internal combustion engine with multiple intake valves for each cylinder for improvement of combustion.

2. Description of the Related Art

Known in the prior art is an internal combustion engine with two intake valves for each cylinder. Such two-valve engines are disclosed in Japanese Unexamined Patent Publication (Kokai) Nos. 52-340108, 54-84128, 58-172424, and 58-1725514. These have a first intake port of a helical shape, a second intake port of a straight shape, and a fuel injector mounted in the first intake port. This type of engine is aimed at providing a stratified combustible mixture in the combustion chamber for achieving a leaner burn.

An intake control valve can be further provided in the second port with the fuel injector located between the intake valve and the intake control valve, as disclosed in Japanese Patent Application Nos. 58-228329 and 59-69176 filed by the same assignee of the present case. In this case, the valve operating timing is set such that the second intake port is opened later than the first intake port. When the intake control valve is closed, air only is first induced in the combustion chamber through the first port and then subsequently the fuel is induced. Therefore, good stratification of the mixture is obtained, with the mixture lean near the piston and rich near the cylinder head where the spark plug is located. This enables good combustion with an overall lean mixture. In this design, it is preferably to set the opening timing of the second intake valve later than the first intake valve.

There is one problem with this arrangement. Since the second valve is open at a later stage of the suction stroke, less air is induced through the second port when the intake control valve is open.

SUMMARY OF THE INVENTION

It is an object of the present invention to provide an internal combustion engine capable of obtaining a highly stratified combustible mixture in the combustion chamber during low engine load conditions in order to increase the lean limit of the combustible mixture to be burnt and capable of providing high power during high engine load conditions by inducing more air.

According to the present invention, there is provided an internal combustion engine having a cylinder block and a cylinder head secured thereto to define cylinders therein, each of the cylinders having a piston inserted therein with a combustion chamber defined above the piston. The engine includes first, second, and third intake passage means communicated, with the combustion chamber of each cylinder, the first intake passage means being helically shaped so that a swirl can be generated in the combustion chamber; first, second, and third intake valves provided for the first, second, and third intake passage means, respectively, the intake valves being operably connected to the piston; a first intake control valve located in the second intake passage means upstream of the second intake valve and a second intake control valve located in the third intake passage means upstream of the third intake valve; actuating means for the intake control valves responsive to operating conditions of the engine; and a fuel injector located in the third intake passage means between the third intake valve and the second intake control valve.

BRIEF DESCRIPTION OF THE INVENTION

The present invention will now be described in greater detail in reference to the drawings showing preferred embodiments of the present invention, in which.

DESCRIPTION OF THE PREFERRED EMBODIMENTS

Figure 1:
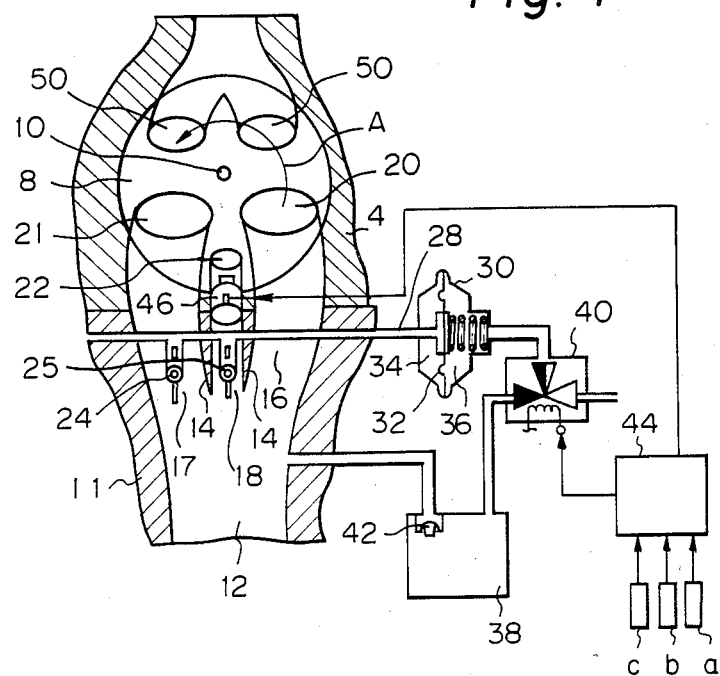
FIG. 1 is a schematic view in horizontal section of one cylinder of an internal combustion engine according to the present invention.
Figure 2:
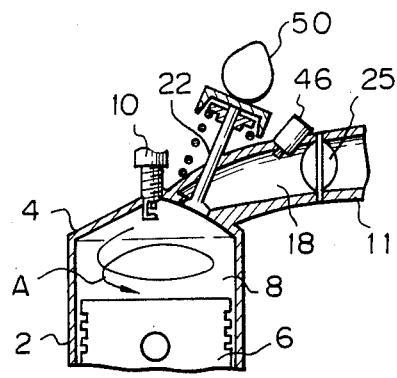
FIG. 2 is a schematic view in vertical section of the engine of FIG. 1.

Referring to FIGS. 1 and 2, an engine of the invention has a cylinder block 2 and a cylinder head 4 in a conventional manner. A piston 6 is inserted in the cylinder and a combustion chamber 8 is defined above the piston 6. A spark plug 10 is located on the cylinder head 4 at the center of the combustion chamber 8.

A common intake passage 12 extends from an intake manifold 11 and divided into three passages 16, 17 and 18 by separating walls 14. All the intake passages (or ports) 16, 17 and 18 are independently open to the combustion chamber 8. Three intake valves 20, 21, and 22 are provided for the three intake passages 16, 17, and 18, respectively, at the interconnecting area between the respective intake passage and the combustion chamber 8. The first intake passage 16 is helically shaped about the valve stem (not shown) of the first intake valve 20, as is well known, so that a swirl, as indicated by arrow A in FIGS. 1 and 2, can be generated in the combustion chamber 8 by the flow of air through the first passage 16.

The second intake passage 17 extends generally straight but slightly offset so that the air through the second passage 17 flows in the same direction in the combustion chamber 8 as the direction of the air flow from the first passage 16. The third passage 18 extends generally straight between the first and second intake passages 16 and 17 toward the spark plug 10. As can be seen, the cross-section of the third intake passage 18 (thus the third intake valve 22) is smaller than that of the other intake passages 16 and 17 (the first and second intake valves 20 and 21). The intake valves 20, 21, and 22 are driven is a conventional manner by cams (such as 50 in FIG. 2) which are interconnected to a crankshaft (not shown) of the engine.

Intake control valves 24 and 25 are provided in the second and the third passages 17 and 18, respectively, at a position near the upstream end of the separating walls 14. The intake control valves 24 and 25 can close the respective passage 17 and 18 when the engine speed and the engine load are smaller than predetermined values and open them when the engine speed and the engine load are larger than those values. The actuator means for the intake control valves 24 and 25 includes an actuating rod 28 and a vacuum diaphragm apparatus 30. The actuator rod 28 is linked to the stems of the intake control valves 24 and 25. The vacuum diaphragm apparatus 30 has a diaphragm 30 in the casing, thus an atmospheric chamber 34 and a vacuum chamber 36 are formed on either side of the diaphragm 32. The actuator rod 28 is fixed to the diaphragm 32, so that the intake control valves 24 and 25 can be controlled by the introduction of the vacuum into the vacuum chamber 36 or the release of the vacuum from the chamber 36. The vacuum is introduced from a vacuum tank 38 via a three-way solenoid valve 40 into the chamber 36, the vacuum tank 38 being connected to the intake manifold 11 via a check valve 42. The solenoid valve 40 is operated under the control of a controller 44 to interconnect the vacuum chamber 36 selectively with the vacuum tank 40 or with the atmosphere. The controller 44 can be constituted by a conventional digital microcomputer having, for example, a central processing unit (CPU), a randam access memory (RAM), and a read only memory (ROM). The controller 44 receives several sensor inputs such as an input from an air flow meter "a", an input from an engine speed sensor "b", an input from a throttle sensor "c", an input from a crank angle sensor, etc, and delivers a control signal to the solenoid valve 40. The controller 44 also delivers a control signal to a fuel injector 46 provided in the third intake passage 18 between the third intake valve 22 and the second intake control valve 25.

Figure 3:
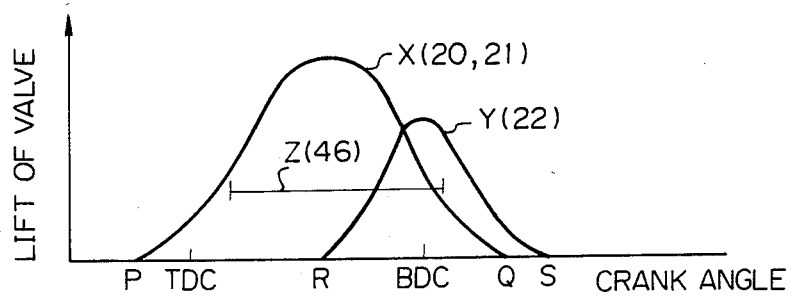
FIG. 3 is a diagram illustrating the valve lift characteristics.

Each intake valve 20, 21, and 22 is respectively operated by the cam (such as 50 in FIG. 2) on the camshaft, the valve operating timing and a lift of the valve being respectively set in correspondence with a profile of the cam. FIG. 3 shows a preferred example of the valve lift of each intake valve 20, 21, and 22 relative to the crank angle. The curve X in FIG. 3 shows the lift characteristic of the intake valves 20 and 21, which, as shown, are caused to open at a point P in an exhaust stroke of the engine slightly earlier than the top dead center (TDC) and to close at a point Q in a compression stroke slightly later than the bottom dead center (BDC). The third intake valve 22 is caused, as shown by the curve Y, to open at a point R in the suction stroke near the midway between the TDC and the BDC and to close at a point S in the compression stroke later than the point Q at which the first and the second intake valves 20 and 21 are to be closed. It will thus be understood that the valve opening timing R of the third intake valve 22 is set in the suction stroke later than the valve opening timing P of the other two intake valves 20 and 21 and that the valve closing timing S of the third intake valve 22 is set in the compression stroke later than the closing timing Q of the other two intake valves 20 and 21. It is not always necessary to operate the first and second intake valves 20 and 21 simultaneously.

As described above, the intake control valves 24 and 25 can be operated in response to the position of a throttle valve, the vacuum level of the engine manifold, engine speed, or the other engine operating parameters for specific engine designs, such that the intake control valves 24 and 25 are closed when both the engine speed and load are below respectively predetermined values and they are opened when either the engine speed or the load is above the predetermined respective value.

Further, the fuel injector 46 is preferably operated independently for each cylinder such that at least when the intake control valves 24 and 25 are closed, each injector 46 is operated, as shown by Z in FIG. 3, to open at a point close to the TDC of the suction stroke so that the opening of the third intake valve 22 follows soon after the start of the operation of the injector 46 and the injected fuel can be fully induced into the combustion chamber 8 while the third intake valve 22 is still open.

For this purpose, it is preferably to make the start of the operation of the fuel injector 46 variable within a range from several dozen crank angle degrees after the TDC in response to the engine speed or the engine load. This timing has a close relationship with the operating timing of the third intake valve 22. It is also possible to operate all the fuel injectors 46 simultaneously when the intake control valves 24 and 25 are open.

While the intake control valves 24 and 25 are closed air is introduced into the combustion chamber 8 through the first passage 16 only when the first intake valve 20 opens, but does not flow through the second intake passage 17 despite the second intake valve 21 being open since the first intake control valve 24 is closed. Air introduced through the first intake passage 16 creates a swirl in the combustion chamber 8, as shown by the arrow A in FIG. 2. While air is being introduced, the fuel is injected by the fuel injector 46 in the third intake passage 18 between the third intake valve 22 and the second intake control valve 25 when the valves 22 and 25 are closed and stays there for a short period to be vaporized. Thereafter, the third intake valve 22 is opened.

As the third intake valve 22 was closed at a point S in the compression stroke in the previous cycle, as will be apparent from FIG. 3, a substantial pressure has been held in the passage 18 between the third intake valve 22 and the second intake control valve 25. Thus the air-fuel mixture can forcibly flow into the combustion chamber 8 when the third intake valve 22 is opened despite the second intake control valve 25 being closed. This mixture is carried by the swirling air to spread in the combustion chamber 8.

In summary, air only is first introduced when the first intake valve 20 is opened, creating the swirl in the combustion chamber 8. With the downward movement of the piston 6 (FIG. 2), the third intake valve 22 is then opened to deliver the rich mixture in the combustion chamber 8. This mixture is carried by the swirling air to advance toward the piston 6, but air is filled near the piston 6. Thus the mixture near the cylinder head 4 is relatively rich. The piston 6 then begins upward movement, after which the first intake valve 20 is closed. At this instant, the third intake valve 22 is still open, according to the diagram of FIG. 3, allowing the rich mixture to still flow in from the third intake passage 18. This rich mixture remains near the cylinder head 4 where the spark plug 10 is located. Then, the third intake valve 22 is closed.

As is apparent from the above description, good stratification of the combustible mixture is achieved, wherein the mixture is rich near the cylinder head 4 and the mixture is lean near the piston 6. This stratification of the mixture can be maintained by the swirl even when the upward movement of the piston 6 is continued. It is, therefore, possible to obtain good combustion by a relatively lean mixture overall, wherein the fuel injector 46 can readily ignite the upper rich portion of the stratified mixture and the flame spreads therefrom. This enables fuel savings and reduces exhaust pollution, it also enables an increased rate of exhaust gas recirculation (EGR). It is to be noted that the valve closing timing S of the third intake valve 22 is set in the compression stroke so that the substantial pressure can be held in the third passage 18 after the third intake valve 22 is closed and that pressure helps to force the mixture out of the third intake passage 18 when the third intake valve 22 is opened.

In this regard, consideration must be given so the valve closing timing of the third intake valve 22 is not too late. If the timing S is too late in the compression stroke, the pressure held in the third passage 18 becomes too high to destroy the swirl, resulting in less stratification.

While the intake control valves 24 and 25 are open, air can be introduced into the combustion chamber through all the intake passages 16, 17, and 18 to establish a higher volumetric efficiency so as to obtain a higher output at the high load and high speed with increased fuel. The opening timing of the third intake valve 22 is also later than that of the other intake valves 20 and 21, but the second intake passage 17 can have a cross-section large enough to pass a large amount of air therethrough to obtain high power. It will be understood that stratification of the mixture can be achieved to some extent under these circumstances.

Figure 4:
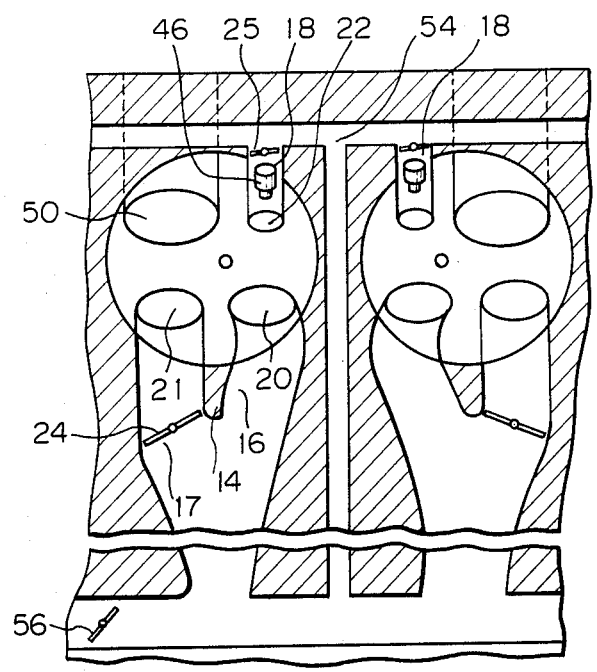
FIG. 4 is a view of another embodiment of the present invention.

FIG. 4 illustrates a further embodiment of the present invention. The embodiment of FIG. 4 is basically similar to the embodiment of FIG. 1, thus the corresponding components are represented by the same reference numbers. Two exhaust valves 50 were provided in FIG. 1 in a counter relation to the intake valves 20, 21, and 22, respectively. In FIG. 4, only one such exhaust valve 50 is provided for each of the intake valves 20, 21, and 22. Also, the third intake valve 22 is located at the position of the second (eliminated) exhaust valve 50. The third intake passage 18 is correspondingly formed with the fuel injector 46 and the second control valve 25 disposed therein. The third intake passage 18 of each cylinder is interconnected to a common passage 54 which is in turn interconnected to the main intake passage downstream of a throttle valve 56.

As described in detail, it is possible to establish good stratification of the mixture wherein the mixture is relatively lean near the piston and substantially rich near the spark plug, thus allowing good combustion by an overall lean air-fuel ratio to provide fuel savings and less air pollution. It is also possible to obtain high power at a high load and high speed of the engine.

I claim:

1. An internal combustion engine having a cylinder block and a cylinder head secured thereonto to define cylinders therein, each of said cylinders having a piston inserted therein with a combustion chamber defined above said piston, said engine, comprising:
    first, second, and third intake passage means communicated with the combustion chamber of each cylinder, said first intake passage means being helically shaped so that a swirl can be generated in the combustion chamber;
    first, second, and third intake valves provided for said first, second, and third intake passage means, respectively, said intake valves being operably connected to said piston;
    a first intake control valve located in said second intake passage means upstream of said second intake valve and a second intake control valve located in said third intake passage means upstream of said third intake valve;
    actuating means for said intake control valves responsive to operating conditions of the engine; and
    a fuel injector located in said third intake passage means between said third intake valve and said second intake control valve.

2. An engine according to claim 1, wherein the opening timing of said third intake valve is set so that the said third intake valve opens later than the other two intake valves.

3. An engine according to claim 1, wherein the size of said third intake valve is smaller than that of the other two intake valves.

4. An engine according to claim 1, wherein the closing timing of said third intake valve is set so that said third intake valve closes later than the other two intake valves.

5. An engine according to claim 1, wherein the start of operation of said fuel injector can be varied relative to the crank angle in response to the engine speed and engine load.

* * * * *